US00RE38177E

(19) United States
(12) Reissued Patent
Yoshida

(10) Patent Number: US RE38,177 E
(45) Date of Reissued Patent: Jul. 8, 2003

(54) IMAGE PROCESSING APPARATUS FOR CHANGING THE RESOLUTION UPON ROTATION OF THE IMAGE

(75) Inventor: Takehiro Yoshida, Tokyo (JP)

(73) Assignee: Canon Kabushiki Kaisha, Tokyo (JP)

(21) Appl. No.: 09/084,432

(22) Filed: May 27, 1998

Related U.S. Patent Documents

Reissue of:
(64) Patent No.: 5,521,720
Issued: May 28, 1996
Appl. No.: 08/248,092
Filed: May 24, 1994

(30) Foreign Application Priority Data

May 28, 1993 (JP) ..... 5-151225

(51) Int. Cl.[7] ..... H04N 1/40
(52) U.S. Cl. ..... 358/448; 358/296; 358/449; 358/451; 382/297; 382/298
(58) Field of Search ..... 358/296, 448, 358/449, 451, 458; 382/296, 297, 298, 299; 355/55, 56

(56) References Cited

U.S. PATENT DOCUMENTS 4,829,586 A * 5/1989 Motegi ..... 382/297
5,038,218 A * 8/1991 Matsumoto ..... 358/296
5,068,904 A * 11/1991 Yamazaki ..... 382/297
5,068,905 A * 11/1991 Hackett et al. ..... 382/299
5,075,784 A * 12/1991 Momose ..... 358/447
5,220,431 A * 6/1993 Yamaguchi ..... 358/296
5,293,432 A * 3/1994 Gonser et al. ..... 382/299
5,327,256 A * 7/1994 Kang et al. ..... 358/451
5,461,459 A * 10/1995 Muramatsu et al. ..... 358/448
5,815,280 A * 9/1998 Ohmura et al. ..... 358/296
5,937,106 A * 8/1999 Murayama ..... 382/296

FOREIGN PATENT DOCUMENTS

EP 249948 * 12/1987 ..... H04N/1/40
GB 2153621 * 8/1985 ..... H04N/1/387
JP 5-108823 * 4/1993 ..... G06F/15/70

* cited by examiner

*Primary Examiner*—Kimberly A. Williams
(74) *Attorney, Agent, or Firm*—Fitzpatrick, Cella, Harper & Scinto

(57) ABSTRACT

An image processing apparatus having a function for rotating image data stored in a memory by 90° while preventing deterioration of image quality. Upon image reading, if the line density in a subscanning direction is lower than the pixel density in a main-scanning direction, the line density is raised close to the pixel density. The reading control is performed in accordance with the possibility of 90° rotation of image in a destination apparatus or a specific size of an original image. This attains efficient use of image memory.

41 Claims, 11 Drawing Sheets

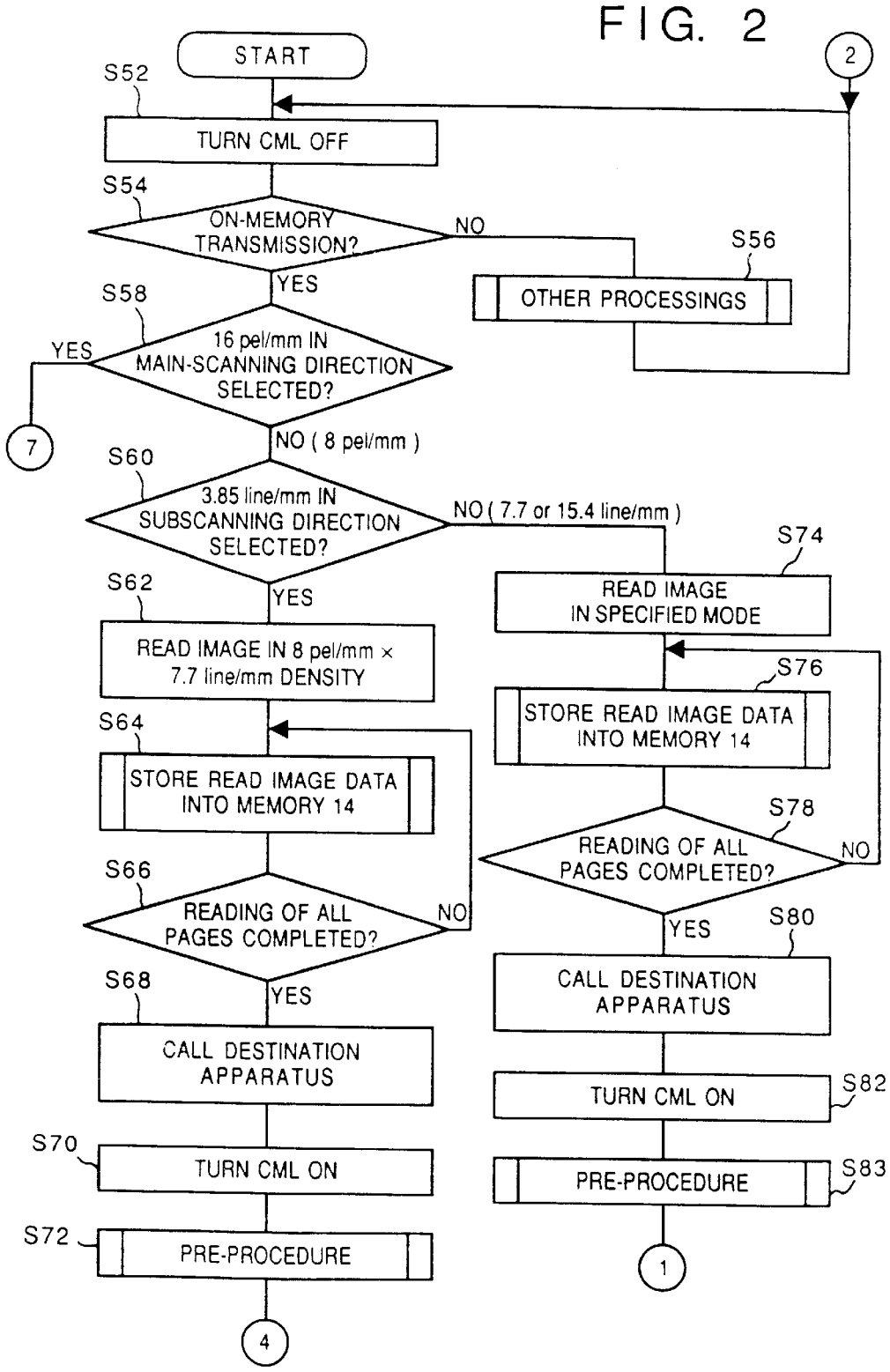
FIG. 2
START
2
S52
TURN CML OFF
S54
ON-MEMORY TRANSMISSION?
NO
S56
OTHER PROCESSINGS
YES
S58
16 pel/mm IN MAIN-SCANNING DIRECTION SELECTED?
YES
7
NO ( 8 pel/mm )
S60
3.85 line/mm IN SUBSCANNING DIRECTION SELECTED?
NO ( 7.7 or 15.4 line/mm )
S74
READ IMAGE IN SPECIFIED MODE
S62
YES
READ IMAGE IN 8 pel/mm × 7.7 line/mm DENSITY
S76
STORE READ IMAGE DATA INTO MEMORY 14
S64
STORE READ IMAGE DATA INTO MEMORY 14
S78
READING OF ALL PAGES COMPLETED?
NO
S66
READING OF ALL PAGES COMPLETED?
NO
YES
S80
CALL DESTINATION APPARATUS
S68
YES
CALL DESTINATION APPARATUS
TURN CML ON
S82
S70
TURN CML ON
PRE-PROCEDURE
S83
S72
PRE-PROCEDURE
1
4

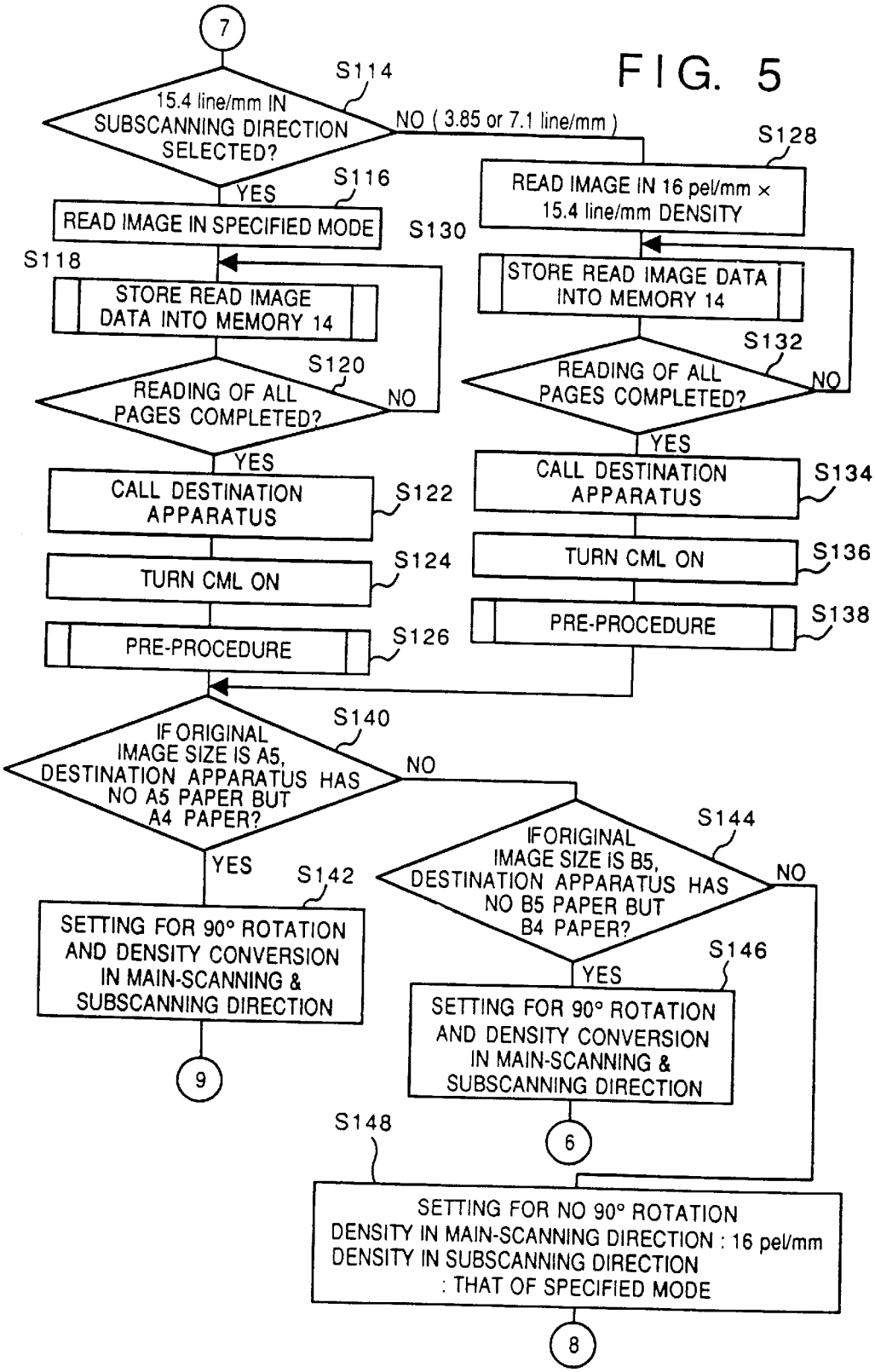
FIG. 5
7
S114
15.4 line/mm IN SUBSCANNING DIRECTION SELECTED?
NO ( 3.85 or 7.1 line/mm )
YES
S116
READ IMAGE IN SPECIFIED MODE
S118
STORE READ IMAGE DATA INTO MEMORY 14
S120
READING OF ALL PAGES COMPLETED?
NO
YES
CALL DESTINATION APPARATUS
S122
TURN CML ON
S124
PRE-PROCEDURE
S126
S128
READ IMAGE IN 16 pel/mm × 15.4 line/mm DENSITY
S130
STORE READ IMAGE DATA INTO MEMORY 14
S132
READING OF ALL PAGES COMPLETED?
NO
YES
CALL DESTINATION APPARATUS
S134
TURN CML ON
S136
PRE-PROCEDURE
S138
S140
IF ORIGINAL IMAGE SIZE IS A5, DESTINATION APPARATUS HAS NO A5 PAPER BUT A4 PAPER?
NO
YES
S142
SETTING FOR 90° ROTATION AND DENSITY CONVERSION IN MAIN-SCANNING & SUBSCANNING DIRECTION
9
S144
IF ORIGINAL IMAGE SIZE IS B5, DESTINATION APPARATUS HAS NO B5 PAPER BUT B4 PAPER?
NO
YES
S146
SETTING FOR 90° ROTATION AND DENSITY CONVERSION IN MAIN-SCANNING & SUBSCANNING DIRECTION
6
S148
SETTING FOR NO 90° ROTATION
DENSITY IN MAIN-SCANNING DIRECTION : 16 pel/mm
DENSITY IN SUBSCANNING DIRECTION
: THAT OF SPECIFIED MODE
8

IMAGE PROCESSING APPARATUS FOR CHANGING THE RESOLUTION UPON ROTATION OF THE IMAGE

Matter enclosed in heavy brackets [ ] appears in the original patent but forms no part of this reissue specification; matter printed in italics indicates the additions made by reissue.

*This application is a reissue of U.S. Pat. No. 5,521,720, which issued from application Ser. No. 08/248,092.*

BACKGROUND OF THE INVENTION

1. Field of the Invention

Present invention relates to an image processing apparatus having a plurality of resolutions.

2. Description of Related Art

Conventional image processing apparatuses, having a function for rotating information stored in a memory by a right angle (hereinafter referred to as "90° rotation function"), read an image in a mode specified from an operation unit and store the read image data into the memory. Such reading modes are usually called "normal mode", "fine mode" and "super-fine mode". The resolution of the normal mode is 8 pel/mm×3.85 line/mm; that of the fine mode, 8 pel/mm×7.7 line/mm; and that of the super-fine mode, 8 pel/mm×15.41 line/mm (pel/mm: density in main-scanning direction; line/mm: density in subscanning direction).

When the conventional apparatus reads an image in the normal mode, it stores the read image data having 8 pel/mm×3.85 line/mm resolution into a memory. The problem is that if a 90° rotation is performed on the stored image data, the line density of the rotated data in the main-scanning direction is degraded to 3.85 pel/mm. The conventional art converts the degraded line density into 8 pel/mm so as to raise the resolution, however, deterioration of image quality cannot be avoided.

SUMMARY OF THE INVENTION

The present invention has been made in consideration of the above situation, and has as its object to provide an image processing apparatus capable of preventing deterioration of image quality.

It is another object of the present invention to provide an image processing apparatus capable of efficiently utilizing an image memory.

According to the present invention, the forgoing objects are attained by providing an image processing apparatus comprising: specifying means for specifying a resolution with respect to a direction defined on an image; input means for inputting the image at a predetermined resolution regardless of the resolution specified by said specifying means; rotation means for rotating the image inputted by said input means by a predetermined angle from the direction; and conversion means for converting a resolution in a resultant direction from rotating the image by said rotation means through the predetermined angle, in accordance with the resolution specified by said specifying means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2 to 5 are flowcharts showing control operation of the first embodiment;

DETAILED DESCRIPTION OF THE PREFERRED EMBODIMENT(S)

Figure 1:
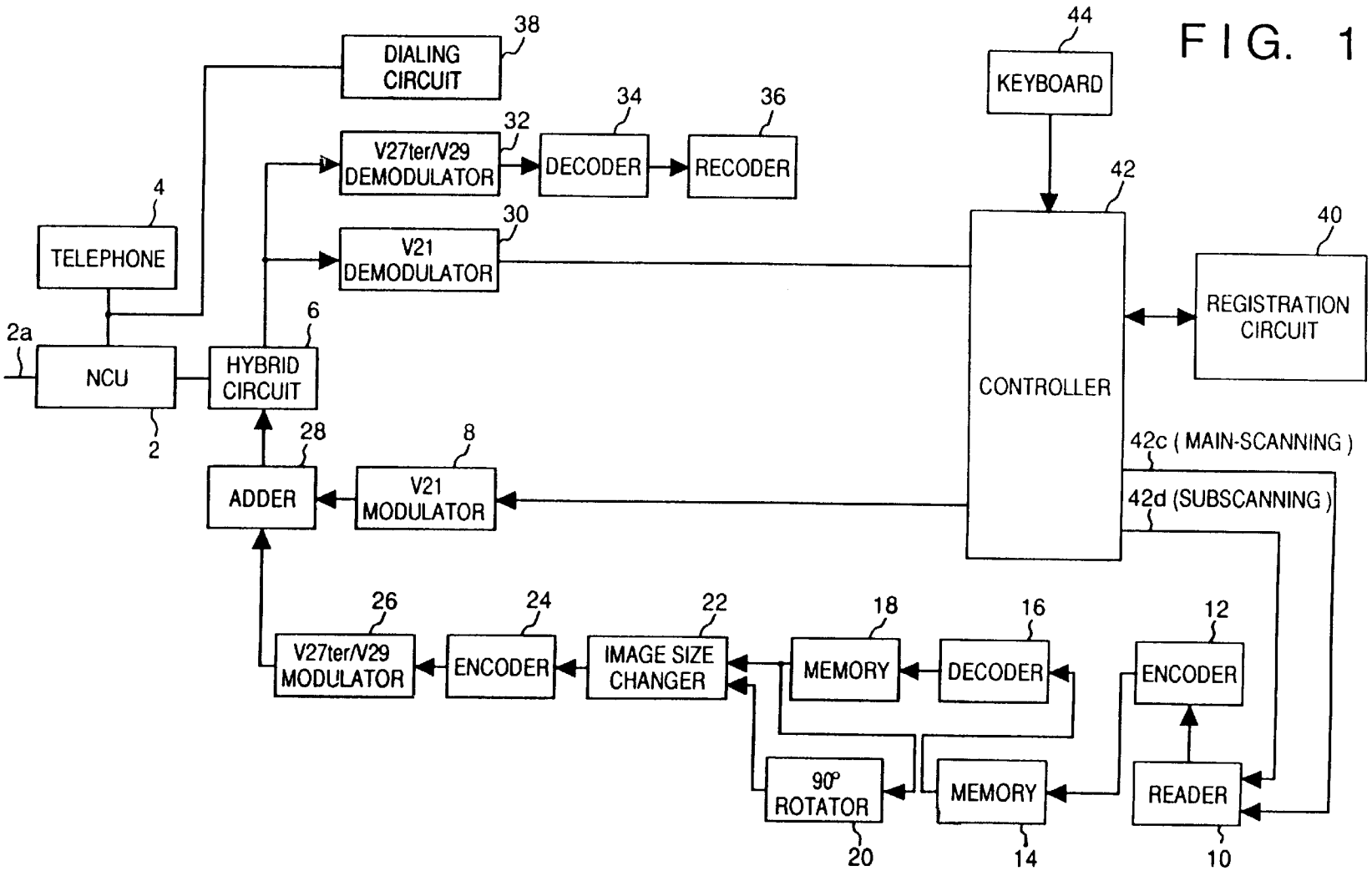
FIG. 1 is a block diagram showing the configuration of a facsimile apparatus according to first to fourth embodiments of the present invention.
Figure 3:
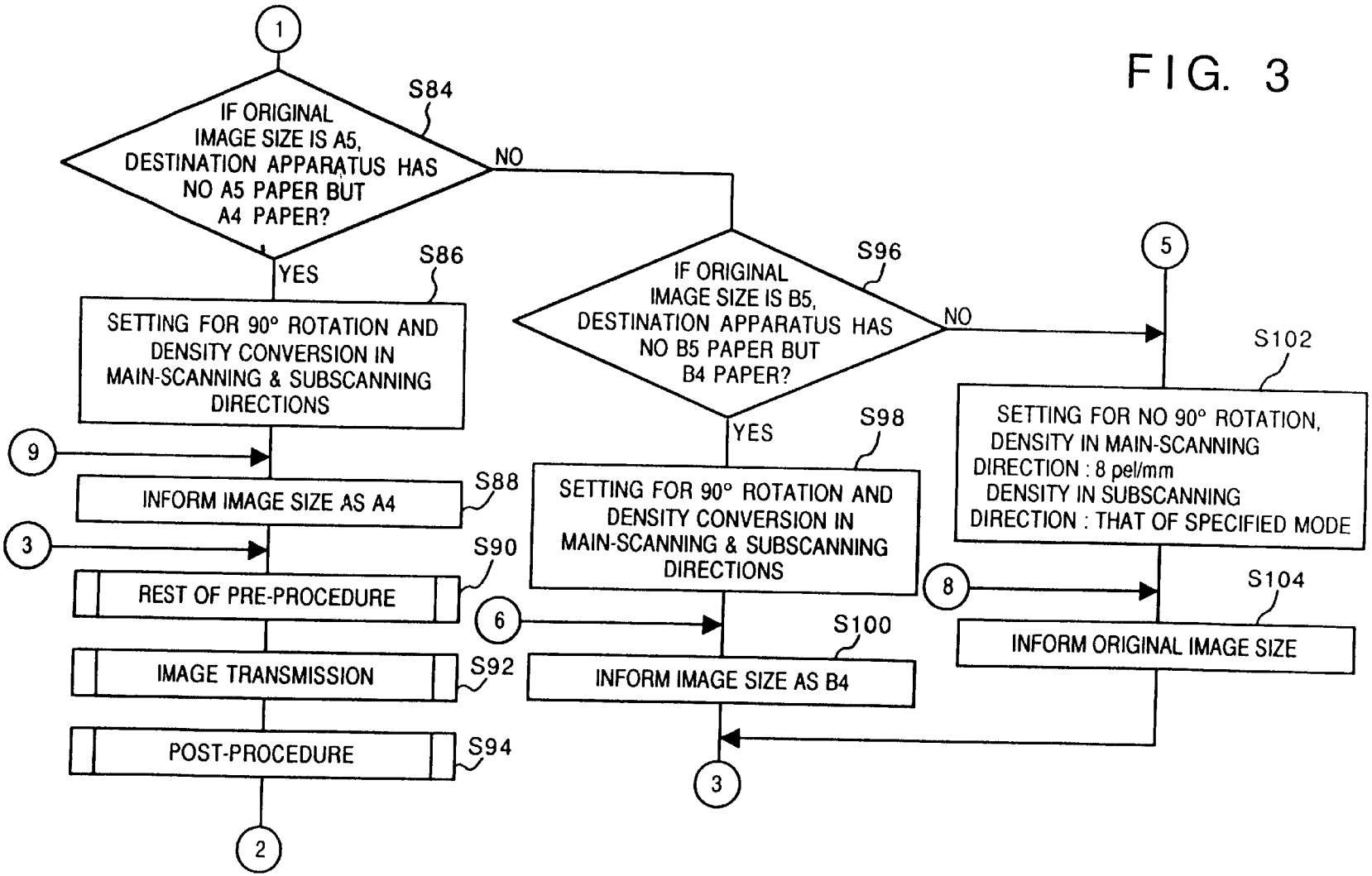
Figure 4:
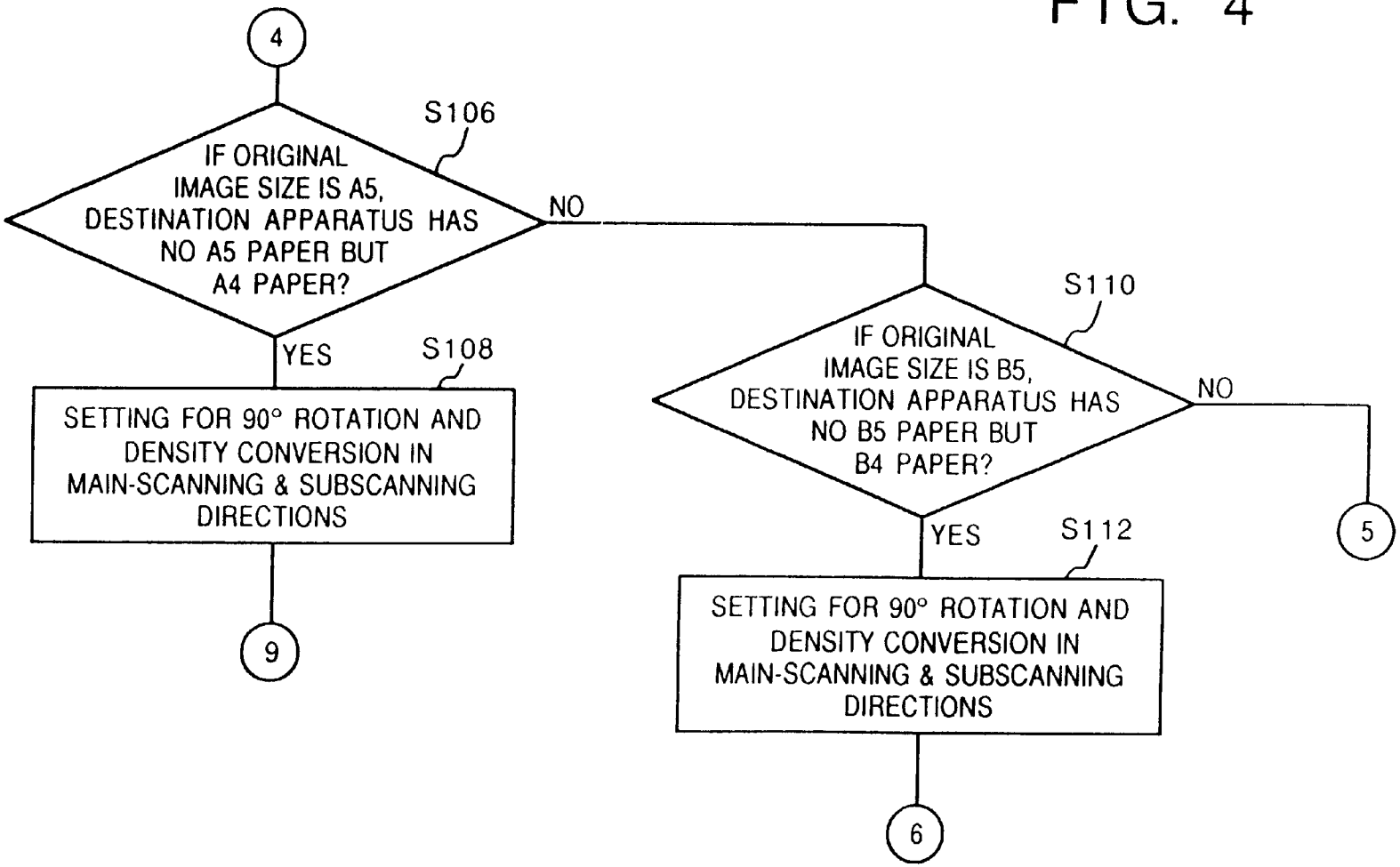

Preferred embodiments of the present invention will be described in detail in accordance with the accompanying drawings.

Overview

A feature of the following embodiments resides in image reading for "on-memory transmission", i.e., reading image data and temporarily storing the read image data into a memory instead of transmitting the data onto a network in a real-time manner, and transmitting the read image data from the memory after the completion of storing the image data. In this reading, if the line density in a subscanning direction is lower than the pixel density in a main-scanning direction, the line density in the subscanning direction is raised close to the pixel density in the main-scanning direction.

In the following embodiments, an original image is read at the reading resolution where the pixel density in the main-scanning direction is 8 pel/mm or 16 pel/mm, and the line density in the subscanning direction is 3.85 line/mm, 7.7 line/mm or 15.4 line/mm. These figures are in conformance to the G3 standard.

Otherwise, the pixel density in the main-scanning direction is 200 dpi, 300 dpi or 400 dpi, the pixel density in the subscanning direction is 200 dpi, 300 dpi or 400 dpi. These figures are in conformance to the G4 standard.

Another feature of the following embodiments resides in image reading for on-memory transmission in accordance with the type of destination apparatus. More specifically, the image reading control is based on possibility of a 90° rotation of image data which is registered in a registration circuit. In a case where the apparatus might transmit 90° rotated image data to a destination according to the possibility, if the line density in the subscanning direction is lower than the pixel density in the main-scanning direction, the line density in the subscanning direction is raised close to the pixel density in the main-scanning direction.

In this case, the possibility of a 90° rotation of image data may be registered as additional information contained in single-touch dialing or abbreviated dialing information. The registration operation will be described in detail later.

Still another feature of the following embodiments resides in limiting the image reading for 90° rotating image data in accordance with specified size of recording sheet.

For example, only when the length in the main-scanning direction of an original image is 148 mm (shorter side of A5 sized paper) or 182 mm (shorter side of B5 sized paper), if the line density in the subscanning direction is lower than the pixel density in the main-scanning direction, the line density in the subscanning direction is raised close to the pixel density in the main-scanning direction.

By virtue of these features, a facsimile apparatus according to the following embodiments can perform the 90° rotation of image data while preventing excessive deterioration of image quality caused by the 90° rotation.

In addition, by virtue of these features, the apparatus can use its memory efficiently, since controls according to the features are performed only when there is a possibility of a 90° rotation of image data stored in the memory, or only in a case where a destination apparatus is registered with a possibility of a 90° rotation.

First Embodiment

FIG. 1 shows the configuration of a facsimile apparatus according to the first embodiment of the present invention.

In FIG. 1, an NCU (network control unit) 2 connects a communication line 2a from a telephone network to a terminal to use the telephone network for data communication, switches the communication line to a data communication path, and maintains a loop. The NCU 2 connects the telephone line 2a to either a telephone 4 side or a facsimile apparatus side. In a normal status, the telephone line 2a is connected to the telephone 4 side.

A hybrid circuit 6 separates a transmission signal from a reception signal. The hybrid circuit 6 transfers a transmission signal from an adder 28 onto the telephone line 2a via the NCU 2, receives a reception signal from a destination apparatus via the NCU 2 and transfers the reception signal to a V27ter/V29 demodulator 32 and a V21 demodulator 30.

V29 demodulator 32 is in conformance to the CCITT Recommendations V.29 protocol; and V21 demodulator 30, the recommendations V.21 protocol.

A V21 modulator 8, which performs modulation conforming to the Recommendations V.21 protocol, modulates a control signal from the controller 42 and transfers the modulated signal to an adder 28.

A reader 10, comprising an image sensing device such as a CCD (charge-coupled device) and an optical unit, sequentially reads image signal for one line in a main-scanning direction from an original image, and generates a signal array representing black and white binary image data. The reader 10 performs image reading with respect to the main-scanning direction in accordance with pixel density outputted onto a signal line 42c, and it performs image reading with respect to the subscanning direction in accordance with line density outputted onto a signal line 42d. Further, the reader 10 detects the size of the original image and informs the controller 42 of the detected size.

An encoder 12 inputs the read image data and performs the MR (modified READ) coding on the data.

A memory 14 stores the code data from the encoder 12 under the control of the controller 42, and transfers the stored data to a decoder 16.

The decoder 16 performs the MR decoding on the input code data, and outputs the decoded data to a memory 18.

The memory 18 stores the decoded data from the decoder 16 under the control of the controller 42, and transfers the stored data to a 90° rotator 20 and an image size changer 22.

The 90° rotator 20 performs 90° rotation on the input data and outputs the rotated data to the image size changer 22. The image size changer 22 enlarges/compresses the input image data by a size-change ratio (in both main-scanning and subscanning directions) under the control of the controller 42, and outputs the enlarged/compressed image data to an encoder 24.

The encoder 24 inputs the data from the image size changer 22 and performs the MH (modified Huffman) coding or the MR coding on the data under the control of the controller 42.

A V27ter/V29 modulator 26 inputs the code data from the encoder 24 and performs modulation conforming to the CCITT Recommendations V.27 ter protocol (differential phase modulation) or V.29 protocol (orthogonal modulation), and outputs the modulated data to an adder 28.

The adder 28 adds the output from the modulator 8 and the output from the modulator 26, and outputs the result to a hybrid circuit 6.

The V21 demodulator 30 inputs the data from the hybrid circuit 6, performs demodulation conforming to the CCITT Recommendations V.21 protocol, and outputs the demodulated data to the controller 42.

A V27ter/V29 demodulator 32, inputs the modulated image signal from the hybrid circuit 6, performs demodulation conforming to the CCITT Recommendations V.27 ter protocol or V.29 protocol, and outputs the modulated data to decoder 34.

The decoder 34 performs the MH or MR decoding on the input data, and outputs the decoded data to a recorder 36.

The recorder 36 sequentially records the data from the decoder 34 in one-line units.

A dialing circuit 38 inputs dial number information from the controller 42 to generate a selection signal, and outputs the selection signal to the NCU 2.

A registration circuit 40 registers information on possibility of 90° rotation of image data on the destination apparatuses indicated by single-touch dialing numbers and abbreviated dialing numbers. In this embodiment, the registration circuit 40 registers sequentially, a single-touch dialing number (e.g., "01" to "24") or an abbreviated dialing number (e.g., "*00" to "*99"), a "space", a telephone number of a destination apparatus (e.g., "03-3481-1111"), a "space", a called party's short form (e.g., "C & Co."), a "space", and a digit indicating a possibility of 90° rotation (e.g., "0": no possibility, "1": 90° rotation may be required).

To read information from the registration circuit 40, a single-touch dialing number or an abbreviated dialing number (e.g., "01") is pressed, so that a telephone number of a corresponding destination, the called party's short form and information on a possibility of 90° rotation (e.g., "03-3481-1111 C & CO. 1") can be outputted.

When an original image is read to be stored into the memory 14 for image transmission, if the line density in the subscanning direction is lower than the pixel density in the main-scanning direction, the controller 42 controls the reading so as to raise the line density in the subscanning direction close to the pixel density in the main-scanning direction. More specifically, the controller 42 outputs a control signal for reading in the main-scanning direction onto the signal line 42c and a control signal for reading in the subscanning direction onto the signal line 42d.

A keyboard 44 inputs various information.

Upon transmission, if a 90° rotation is not performed, sampled of image data is performed with respect to the line density in the subscanning direction so that the resolution of the read image data corresponds to that of a specified mode, i.e., 8 pel/mm or 16 pel/mm in the main-scanning direction× 3.85 line/mm, 7.7 line/mm or 15.4 line/mm in the subscanning direction.

It should be noted that the resolution in main-scanning and subscanning directions can be specified from the keyboard 44.

Next, the control operation of the controller 42 according to the present embodiment will be described with reference to the flowcharts in FIGS. 2 to 5.

The reading resolution of a "normal mode", specified from the keyboard 44, is 8 pel/mm (main-scanning direction)×3.85 line/mm (subscanning direction); a "fine mode", 8 pel/mm×7.7 line/mm; a "super fine mode", 8 pel/mm×11.5 line/mm; and a "ultra fine mode", 16 pel/mm×15.4 line/mm.

In step S52, a CML (connect modem to line) in the NCU 2 is turned off so as to connect the telephone 4 with the line 2a. In step S54, whether or not on-memory transmission is selected from the keyboard 44 is determined. If NO, the process proceeds to step S56 to perform other processings.

If YES in step S54, the process proceeds to step S58, in which whether or not the pixel density in the main-scanning direction selected from the keyboard 44 is 16 pel/mm is determined. If YES, the process proceeds to step S114, while if NO, i.e., the selected pixel density is 8 pel/mm, proceeds to step S60.

In step S60, whether or not the line density in the subscanning direction selected from the keyboard 44 is 3.85 line/mm is determined. If YES, the process proceeds to step S62, while if NO, i.e., the selected line density is 7.7 line/mm or 15.4 line/mm, proceeds to step S74.

In step S62, the reader 10 is informed of the reading resolution where the pixel density in the main-scanning direction is 8 pel/mm, and the line density in the subscanning direction is 7.7 line/mm. In step S64, the read image information is encoded into MR code data and stored into the memory 14.

Next, in step S66, whether or not the reading of all the pages has completed is determined. If YES, a selection signal corresponding to a telephone number of the destination apparatus, inputted from the keyboard 44 is outputted onto the line 2a in step S68.

Then in step S70, the CML in the NCU 2 is turned on so as to connect the hybrid circuit 6 with the line 2a. In step S72, pre-procedure for image transmission is performed. Thereafter, the process advances to step S106 to be described later.

In step S74, the reader 10 is instructed to perform reading in the specified mode, and in step S76, the read image information is encoded into MR code data and stored into the memory 14. In step S78, whether or not the reading of all the pages has completed is determined. If YES, the process proceeds to step S80, in which a selection signal corresponding to the telephone number of the destination apparatus is outputted onto the line 2a.

Next, in step S82, the CML in the NCU 2 is turned on, and in step S83, the pre-procedure for image transmission is performed. In step S84, on the assumption that the size of the original image is A5, whether or not the destination apparatus has no A5-sized recording sheet but A4-sized recording sheet is determined. If YES, the process proceeds to step S86, while if NO, proceeds to step S96.

In step S86, setting for data transmission in the fine mode is performed. More specifically, the setting is made in a manner such that as a result of the 90° rotation the pixel density in the main-scanning direction becomes 7.7 or 15.4 pel/mm and the line density in the subscanning direction becomes 8 line/mm, and the image size changer 22 changes the pixel density in the main-scanning direction from 7.7 pel/mm or 15.4 pel/mm to 8 pel/mm, and the line density in the subscanning direction from 8 line/mm to 7.7 line/mm.

In step S88, in the pre-procedure for the transmission, the destination apparatus is informed of the length of image in the main-scanning direction as A4, and in step S90, the rest of the pre-procedure is performed. In step S92, the image signal stored in the memory 14 is 90° rotated, and the density in the main-scanning and subscanning directions are converted in accordance with the settings in step S86. Then, the image data is transmitted. In step S94, post-procedure of the image transmission is performed. Thereafter, the process returns to step S52.

In step S96, on the assumption that the size of the original image is B5, whether or not the destination apparatus has no B5-sized recording sheet but B4-sized recording sheet is determined. If YES, the process proceeds to step S98, while if NO, proceeds to step S102.

In step S98, setting for data transmission in the fine mode is performed. More specifically, the setting is made in a manner such the as a result of the 90° rotation the pixel density in the main-scanning direction becomes 7.7 or 15.4 pel/mm and the line density in the subscanning direction becomes 8 line/mm, and the image size changer 22 changes the pixel density in the main-scanning direction from 7.7 pel/mm or 15.4 pel/mm to 8 pel/mm, and the line density in the subscanning direction from 8 line/mm to 7.7 line/mm. In step S100, in the pre-procedure for the transmission, the destination apparatus is informed of the length of image in the main-scanning direction as B4, and in step S90, the rest of the pre-procedure is performed. In step S92, the image signal stored in the memory 14 is 90° rotated, and the density in the main-scanning and subscanning directions are converted in accordance with the settings in step S98. Then, the image data is transmitted.

In step S102, setting for the fine mode transmission is performed such that the 90° rotation is not performed, the pixel density of the transmission data in the main-scanning direction is 8 pel/mm, and the line density in the subscanning direction corresponds to that of the specified mode.

In step S104, in the pre-procedure for the transmission, the size of the original image is informed as the length in the main-scanning direction.

In step S90, the rest of the pre-procedure is performed. In step S92, the image data stored in the memory 14 is transmitted without 90° rotation and the density conversion in the main-scanning and subscanning directions.

In step S106, following the above-described step S72, on the assumption that the size of the original image is A5, whether or not the destination apparatus has no A5-sized recording sheet but A4-sized recording sheet is determined, based on the received control signal from the destination apparatus. If YES, the process proceeds to step S108, while if NO, proceeds to step S110.

In step S108, setting for data transmission in the normal mode is performed. More specifically, the setting is made in a manner such that as a result of the 90° rotation, the pixel density in the main scanning direction becomes 7.7 pel/mm and the line density in the subscanning direction becomes 8 line/mm, and the image size changer 22 changes the pixel density in the main-scanning direction from 7.7 pel/mm to 8 pel/mm and the line density in the subscanning direction from 8 line/mm to 3.85 line/mm.

In other words, the image size changer 22 samples the image data in the subscanning direction in accordance with the above settings. Thus, the resolution of the image data to be transmitted becomes that of the normal mode.

In step S88, in the pre-procedure for the transmission, the destination apparatus is informed of the length of image in the main-scanning direction as A4. In step S90, the rest of the pre-procedure is performed. In step S92, the image data in the memory 14 is 90° rotated, and the density in the main-scanning and subscanning directions are converted in accordance with the settings in step S108.

In step S110, on the assumption that the size of the original image is B5, whether or not the destination apparatus has no B5-sized recording sheet but B4-sized recording sheet is determined. If YES, the process proceeds to step S112, while if NO, proceeds to the above-described step S102.

In step S112, setting for data transmission in the normal mode is performed. More specifically, the setting is made in a manner such that as a result of the 90° rotation, the pixel density in the main scanning direction becomes 7.7 pel/mm and the line density in the subscanning direction becomes 8 line/mm, and the image size changer 22 changes the pixel density in the main-scanning direction from 7.7 pel/mm to 8 pel/mm and the line density in the subscanning direction from 8 line/mm to 3.85 line/mm.

In other words, the image size changer 22 samples the image data in the subscanning direction in accordance with the above settings. Thus, the resolution of the image data to be transmitted becomes that of the normal mode.

In step S100, in the pre-procedure for the transmission, the destination apparatus is informed of the image length in the main-scanning direction as B4. In step S90, the rest of the pre-procedure is performed. In step S92, the image data in the memory 14 is 90° rotated, and the density in the main-scanning and subscanning directions are converted in accordance with the settings in step S108.

In a case where the process proceeds from step S110 to step S102, setting for the normal mode data transmission is performed such that a 90° rotation is not performed, the pixel density in the main-scanning direction is not converted, i.e., 8 pel/mm is maintained, and the line density in the subscanning direction is converted (sampled) from 7.7 line/mm to 3.85 line/mm.

In step S104, the destination apparatus is informed of the size of the original image as the transmission image size. In step S90, the rest of the pre-procedure is performed. In step S92, the image data in the memory 14 is 90° rotated, and the density in the subscanning direction is sampled to the specified line density in accordance with the setting in step S102, while the density in the main scanning direction is maintained. Then, the image data is transmitted.

In step S114, whether or not the line density in the subscanning direction, selected from the keyboard 44, is 15.4 line/mm is determined. If YES, the process proceeds to step S116, while if NO, i.e., the selected density is 3.85 line/mm or 7.7 line/mm, proceeds to step S128.

In step S116, the reader 10 is instructed to perform image reading in the specified mode having 16 pel/mm×15.4 line/mm density. In step S118, the read image data is encoded into MR code data and stored into the memory 14.

In step S120, whether or not the reading of all the pages has completed is determined. If YES, the process proceeds to step S122, in which a selection signal corresponding to the telephone number of the destination apparatus is outputted onto the line 2a.

Next, in step S124, the CML in the NCU 2 is turned on, and in step S126, the pre-procedure for image transmission is performed. After this, the process proceeds to step S140.

In step S128, the reader 10 is instructed to perform image reading in the density of 16 pel/mm (main scanning direction)×15.4 line/mm (subscanning direction). In step S130, the read image data is encoded into HR code data and stored into the memory 14.

In step S132, whether or not the reading of all the pages has completed is determined. If YES, the process proceeds to step S134, in which a selection signal corresponding to the telephone number of the destination apparatus is outputted onto the line 2a.

In step S136, the CML in the NCU 2 is turned on. In step S138, pre-procedure for the image transmission is performed, then the process proceeds to step S140.

In step S140, on the assumption that the size of the original image is A5, whether or not the destination apparatus has no A5-sized recording sheet but A4-sized recording sheet is determined. If YES, the process proceeds to step S142, while if NO, proceeds to step S144.

In step S142, setting for data transmission in the ultra fine mode is performed. More specifically, the setting is made in a manner such that as a result of the 90° rotation, the pixel density in the main scanning direction becomes 15.4 pel/mm and the line density in the subscanning direction becomes 16 line/mm, and the image size changer 22 changes the pixel density in the main-scanning direction from 15.4 pel/mm to 16 pel/mm, and the line density in the subscanning direction from 16 line/mm to designated density (3.85 line/mm, 7.7 line/mm or 15.4 line/mm).

In step S144, on the assumption that the size of the original image is B5, whether or not the destination apparatus has no B5-sized recording sheet but B4-sized recording sheet is determined. If YES, the process proceeds to step S146, while if NO, proceeds to step S148.

In step S146, setting for transmission in the ultra fine mode is performed. More specifically, the setting is made in a manner such that as a result of the 90° rotation, the pixel density in the main scanning direction becomes 15.4 pel/mm and the line density in the subscanning direction becomes 16 line/mm, and the image size changer 22 changes the pixel density in the main-scanning direction from 15.4 pel/mm to 16 pel/mm, and the line density in the subscanning direction from 16 line/mm to designated density (3.85 line/mm, 7.7 line/mm or 15.4 line/mm).

In step S148, setting for the ultra fine mode transmission is performed such that the 90° rotation is not performed, the pixel density of the transmission data in the main-scanning direction is 16 pel/mm, and the line density in the subscanning direction corresponds to that of the specified mode (3.85 line/mm, 7.7 line/mm or 15.4 line/mm).

In the present embodiment, the pixel density in the main-scanning direction is 8 pel/mm or 16 pel/mm, and the line density in the subscanning direction is 3.85 line/mm, 7.7 line/mm or 15.4 line/mm. However, the pixel and line densities may be represented by inch unit in conformance to the G4 standard. That is, in this example, the density in the main-scanning direction may be 200 dpi, 300 dpi or 400 dpi, and the density in the subscanning direction may be 200 dpi, 300 dpi or 400 dpi.

Further, the apparatus in the transmitting side may read an original image in a specified mode having inch-based resolution and transmit the image data to an apparatus which performs density conversion based on mm-based resolution. Otherwise, the apparatus in the transmitting side may read an original image in a specified mode having mm-based resolution and transmit the image data to an apparatus which performs inch-based density conversion.

Second Embodiment

In the first embodiment, upon image reading for on-memory transmission, if the line density in a subscanning direction is lower than the pixel density in a main-scanning direction, the image reader performs the reading in a manner such that the line density in the subscanning direction is raised close to the pixel density in the main-scanning direction. In the second embodiment, image reading is made in accordance with the type of destination apparatus. Possibility of a 90° rotation is registered in the registration circuit 40, and upon image reading for on-memory transmission in accordance with the registered possibility, if the line density in the subscanning direction is lower than the pixel density in the main-scanning direction, the line density in the subscanning direction is raised close to the pixel density in the main-scanning direction.

The second embodiment also employs the facsimile apparatus shown in FIG. 1.

It should be noted that in a case where a destination facsimile apparatus has A5-sized recording sheet and/or B5-sized recording sheet, there is no possibility of 90° rotation.

In this embodiment, information on possibility of 90° rotation is registered as additional information to single-touch dialing information or abbreviated dialing information.

Next, the operation of the second embodiment will be described with reference to the flowchart in FIG. 6, which shows different part of the operation of the first embodiment (FIGS. 2 to 5).

First, in step S52, the CML in the NCU 2 is turned off, and in step S54, whether or not on-memory transmission is to be performed is determined. If NO, the process proceeds to step S152, in which whether or not registration of possibility of 90° rotation has been instructed is examined. If YES, the process proceeds to step S154, in which the possibility of 90° rotation is registered in the registration circuit 40 in correspondence with a single-touch/abbreviated dialing number of the destination apparatus. If NO, the process proceeds to step S56.

On the other hand, if YES in step S54, the process proceeds to step S160, in which the image reading for on-memory transmission is initiated in accordance with pressing of a single-touch dialing key or an abbreviated dialing key is determined. If YES, the process proceeds to step S162, while if NO, proceeds to step S58.

In step S162, whether or not possibility of 90° rotation is registered in correspondence with the telephone number of the destination apparatus is determined. If YES, the process proceeds to step S58, while if NO, proceeds to step S166.

In step S58 and the subsequent steps, image reading is performed, and if the line density in the subscanning direction is lower than the pixel density in the main-scanning direction, the line density in the subscanning direction is raised close to the pixel density in the main-scanning direction.

In step S166, whether or not the pixel density in the main-scanning direction selected from the keyboard 44 is 16 pel/mm is determined. If YES, the process proceeds to step S172 to perform the above-described processings in steps S116 to S126, i.e., storing the read image data into the memory 14 in accordance with the specified mode, calling the destination apparatus, and perform pre-transmission procedure. Then, the process advances to step S148, in which image transmission without 90° rotation is performed.

If the selected pixel density in the main-scanning direction is 8 pel/mm, the process proceeds to steps S74 to S83, to perform the processings described in the first embodiment, i.e., storing the read image data into the memory 14 in accordance with the specified mode, calling the destination apparatus, and performs the pre-transmission procedure. Then, the process advances to step S102, in which image transmission without 90° rotation is performed.

Third Embodiment

In this embodiment, the apparatus performs broadcasting under the conditions described in the second embodiment. More specifically, when an apparatus with possibility of 90° rotation, registered as additional information of single-touch/abbreviated dialing number, or, indicated by manual selection (e.g., from ten-key) is included in a plurality of destination apparatuses, if the line density in the subscanning direction is lower than the pixel density in the main-scanning direction, the line density in the subscanning direction is raised close to the pixel density in the main-scanning direction.

The third embodiment also employs the facsimile having the configuration shown in FIG. 1.

Figure 6:
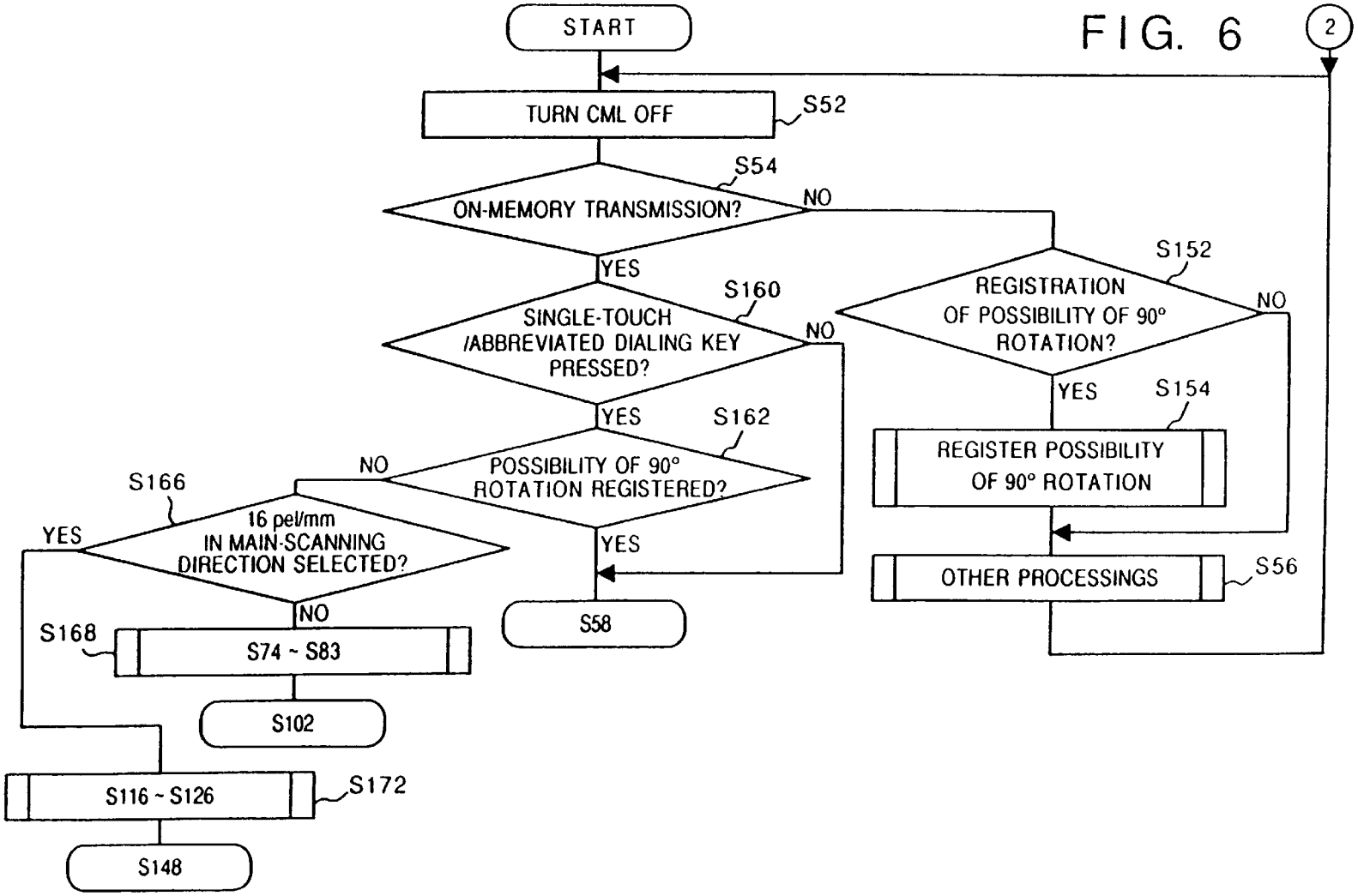
FIG. 6 is a flowchart showing control operation of the second embodiment.
Figure 7:
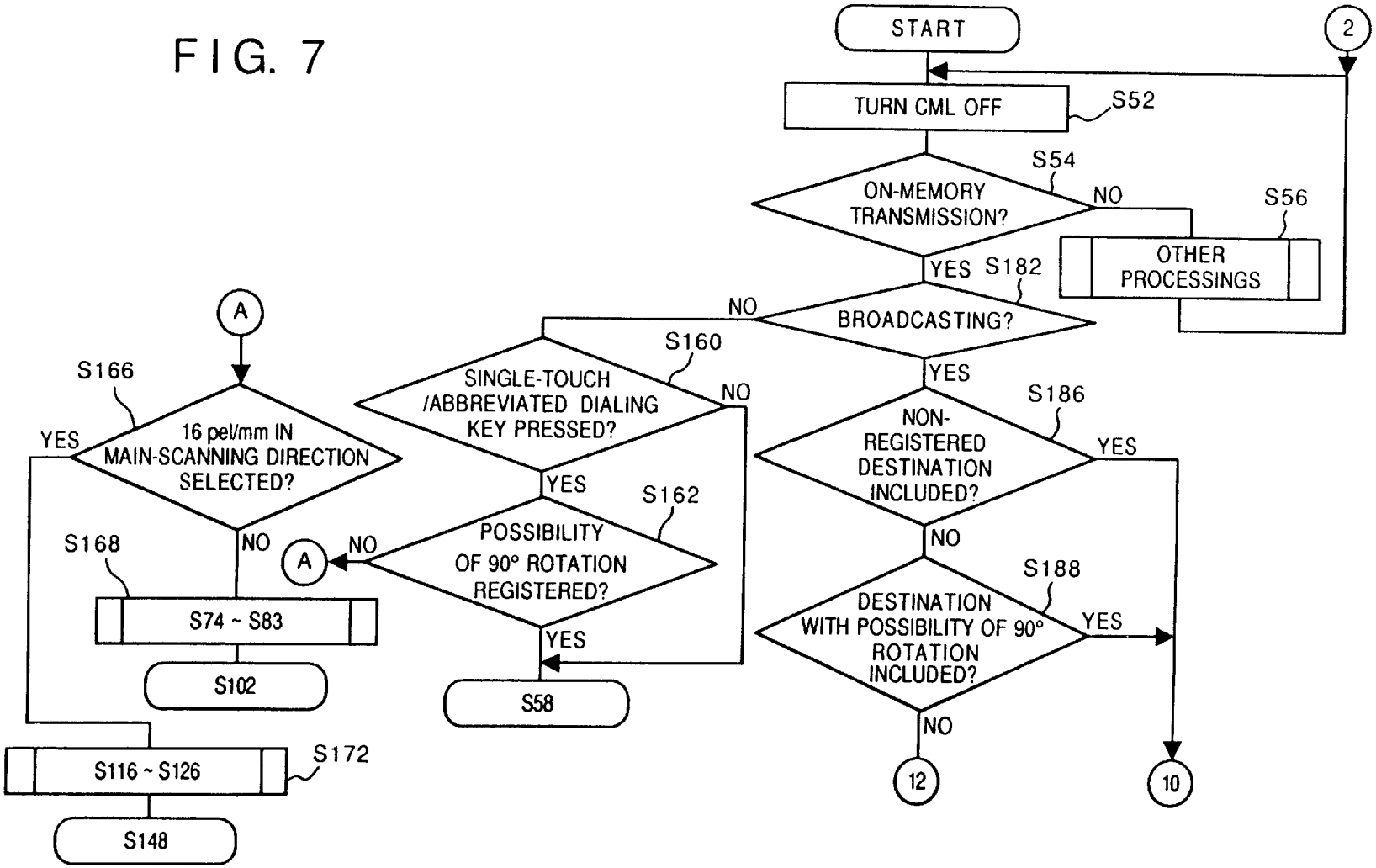
FIGS. 7 to 10 are flowcharts showing control operation of the third embodiment.
Figure 8:
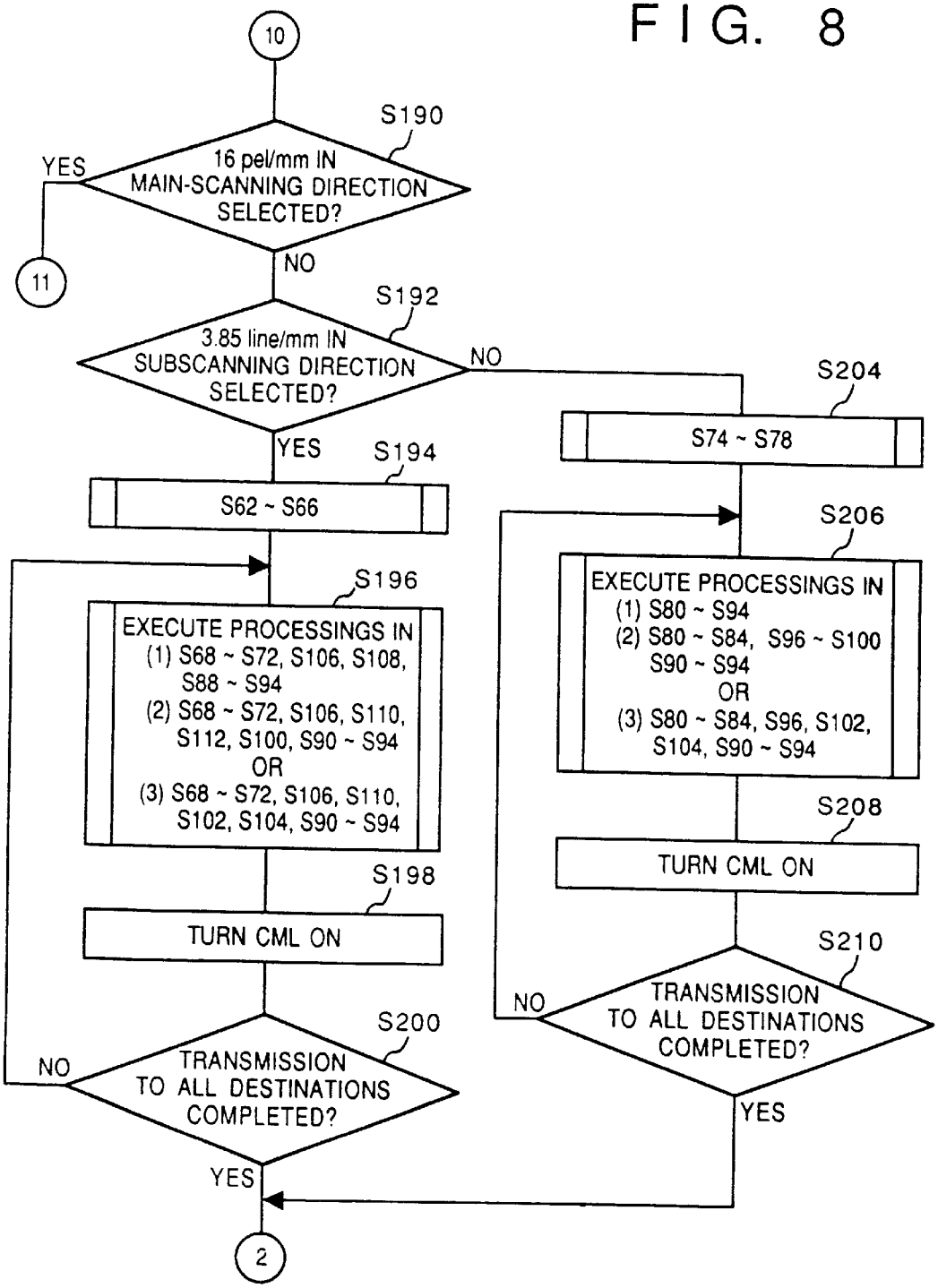
Figure 9:
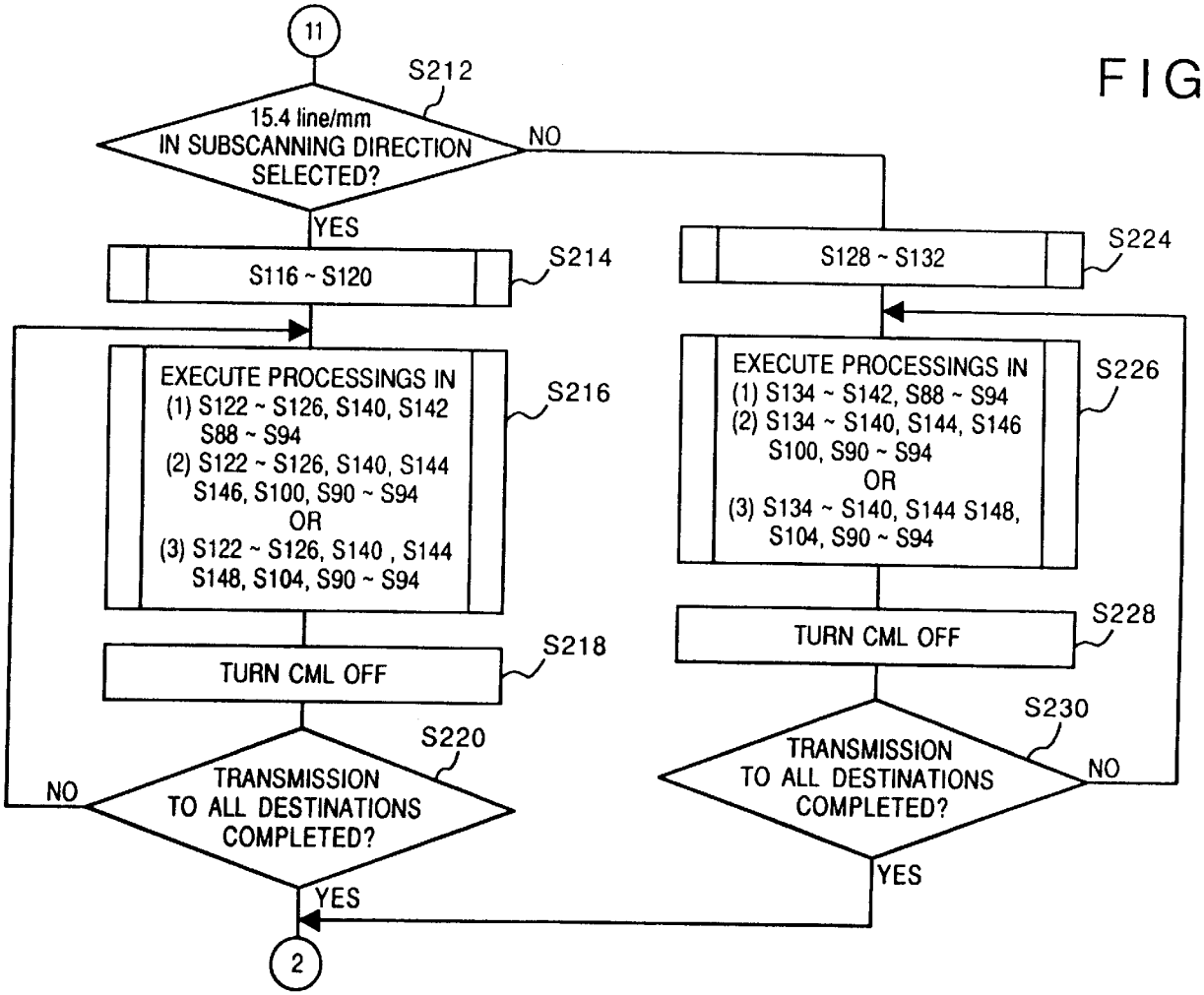
Figure 10:
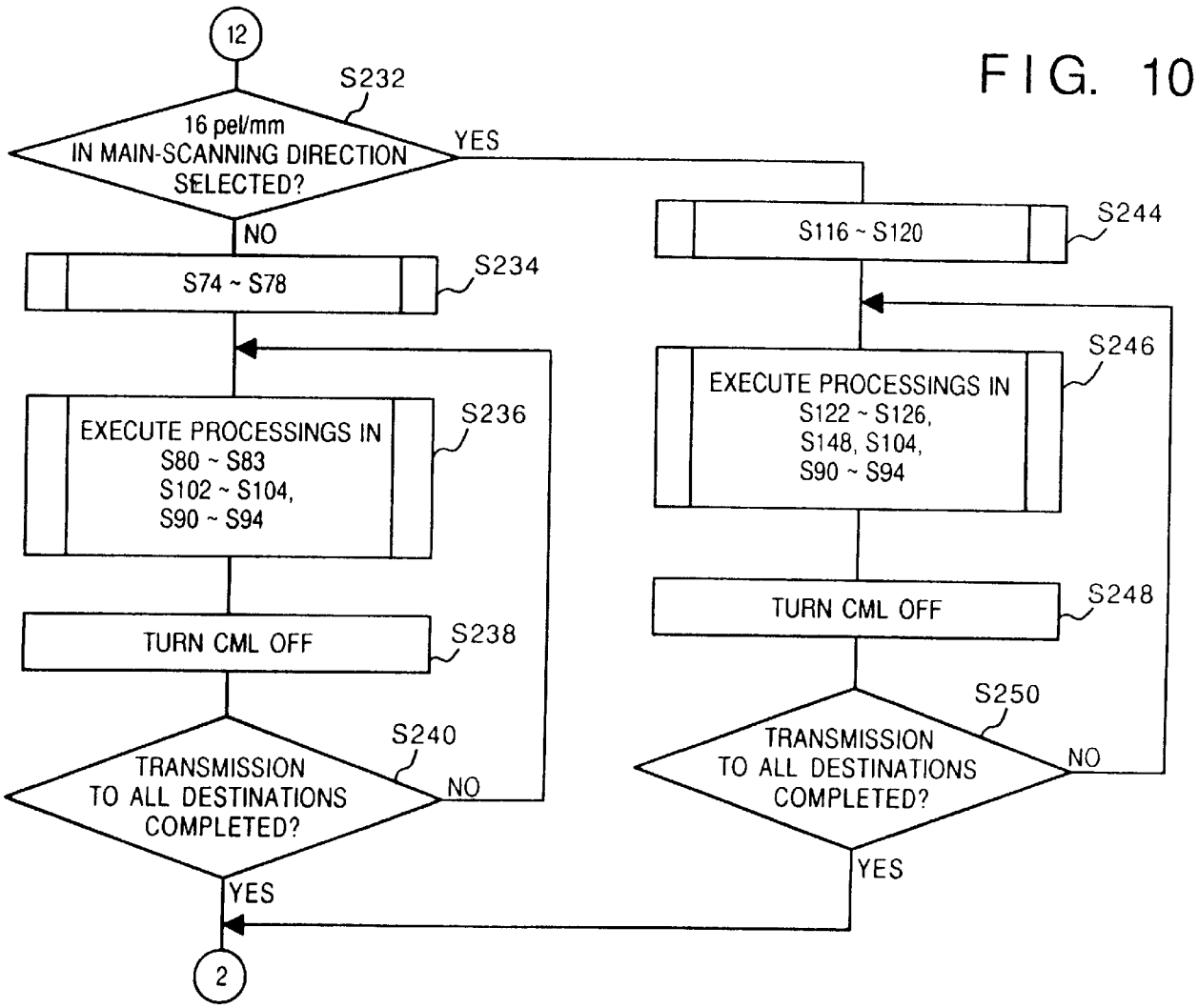

Next, the characteristic operation of the third embodiment will be described with reference to the flowcharts in FIGS. 7 to 10 which show a part different from the processings in the second embodiment (FIG. 6).

In step S52, the CML in the NCU 2 is turned off, and in step S54, whether or not on-memory transmission is made is examined. If YES, the process proceeds to step S182, in which whether or not broadcasting has been instructed is determined. If NO, the process proceeds to step S160. If YES, the process proceeds to step S186, in which whether or not the apparatuses in the broadcasting destinations include an apparatus in the broadcasting destinations having a telephone number which is not registered as a single-touch/abbreviated dialing number is determined. If YES, the process proceeds to step S190, while if NO, proceeds to step S188.

In step S188, whether or not the single-touch/abbreviated dialing numbers of the plurality of destination apparatuses include a dialing number registered with possibility of 90° rotation is determined. If YES, the process proceeds to step S190, while if NO, proceeds to step S232.

In step S190, whether or not the pixel density in the main-scanning direction selected from the keyboard 44 is 16 pel/mm is determined. If YES, the process proceeds to step S212, while if NO, i.e., the selected density is 8 pel/mm, proceeds to step S192.

In step S192, whether or not the line density in the subscanning direction selected from the keyboard is 3.85 line/mm is determined. If YES, the process proceeds to step S194, while if NO, i.e., the selected density is 7.7 line/mm or 15.4 line/mm, the proceeds to step S204.

In step S194, the processings in steps S62 to S66 as described in the first embodiment are performed, i.e., the read image data is stored into the memory 14. In step S196, any of the processings in steps (1) S68 to S72, S106 to S108, S88 to S94; (2) S68 to S72, S106, S110, S112, S110, S90 to S94; or (3) S68 to S72, S106, S110, S102 to S104, S90 to S94, described in the first embodiment, are performed. This executes transmission to one of the destination apparatuses. At this time, a 90° rotation is performed in correspondence with necessity.

In step S198, the CML in the NCU 2 is turned off. In step S200, whether or not the transmission to all the destinations has completed is determined. If YES, the process returns to step S52, while if NO, returns to step S196.

In step S204, the processings in S74 to S78 described in the first embodiment are performed, i.e., the read image signal is stored into the memory 14. In step S206, any of the above-described processings in (1) S80 to S94; (2) S80 to S84, S96 to S100, S90 to S94; (3) S80 to S84, S96, S102, S104, S90 to S94 are performed. This executes transmission to one of the destination apparatuses. At this time, a 90° rotation is performed in correspondence with necessity.

In step S208, the CML in the NCU 2 is turned off. In step S210, whether or not the transmission to all the destinations has completed is determined. If YES, the process returns to step S52, while if NO, returns to step S206.

In step S212, whether or not the line density in the subscanning direction selected from the keyboard 44 is 15.4 line/mm is determined. If YES, the process proceeds to step S214, while if NO, i.e., the selected density is 3.85 line/mm or 7.7 line/mm, proceeds to step S224.

In step S214, the processings in steps S116 to S120 described in the first embodiment are performed, i.e., the image signal is stored into the memory 14. In step S216, any of the above-described processings (1) S122 to S126, S140, S142, S88 to S94; (2) S122 to S126, S140, S144, S146, S100, S90 to S94; (3) S122 to S126, S140, S144, S148, S104, S90 to S94 are performed. This executes transmission to one of the destination apparatuses. At this time, a 90° rotation is performed in correspondence with necessity.

In step S218, the CML in the NCU 2 is turned off. In step S220, whether or not the transmission to all the destinations has completed is determined. If YES, the process returns to step S52, while if NO, returns to step S216.

In step S224, the processings in step S128 to S132 described in the first embodiment are performed, i.e., the image signal is stored into the memory 14. In step S226, any of the above-described processings in (1) S134 to S142, S88 to S94; (2) S134 to S140, S144, S146, S100, S90 to S94; (3) S134 to S140, S144, S148, S104, S90 to S94 are performed. This executes transmission to one of the destination apparatuses. At this time, a 90° rotation is performed in correspondence with necessity.

In step S228, the CML in the NCU 2 is turned off. In step S230, whether or not the transmission of all the destinations have completed is determined. If YES, the process returns to step S52, while if NO, returns to step S226.

In step S232, whether or not the pixel density in the main-scanning direction selected from the keyboard 44 is 16 pel/mm is determined. If YES, the process proceeds to step S244, while if NO, i.e., the selected density is 8 pel/mm, proceeds to step S234.

In step S234, the processings in steps S74 to S78 described in the first embodiment are performed, i.e., the image signal is stored into the memory 14. In step S236, the above-described steps S80 to 83, S102 to S104, S90 to S94 are performed for transmission to one destination. This includes no 90° rotation.

In step S238, the CML in the NCU 2 is turned off, and in step S240, whether or not the transmission of all the pages has completed is determined. If YES, the process returns to step S52, while if NO, returns to step S236.

In step S244, the processings in steps S116 to S120 described in the first embodiment are performed, i.e., the image signal is stored into the memory 14. In step S246, the above-described processings in steps S122 to S126, S148, S104, S90 to S94 are performed for transmission to one destination. This includes no 90° rotation.

In step S248, the CML in the NCU 2 is turned off, and in step S250, whether or not the transmission to all the destinations nations has completed is determined. If YES, the process returns to step S52, while if NO, returns to step S246.

Fourth Embodiment

This embodiment also employs the facsimile apparatus having the configuration shown in FIG. 1. In this embodiment, the image reading for 90° rotation is limited in accordance with specified size of recording sheet.

Only in a case where the length of an original image in a main-scanning direction is 148 mm (short side of A5-sized paper) or 182 mm (short side of B5-sized paper), upon image reading for on-memory transmission, if the line density in a subscanning direction is lower than the pixel density in a main-scanning direction, the line density in the subscanning direction is raised close to the pixel density in the main-scanning direction.

Figure 11:
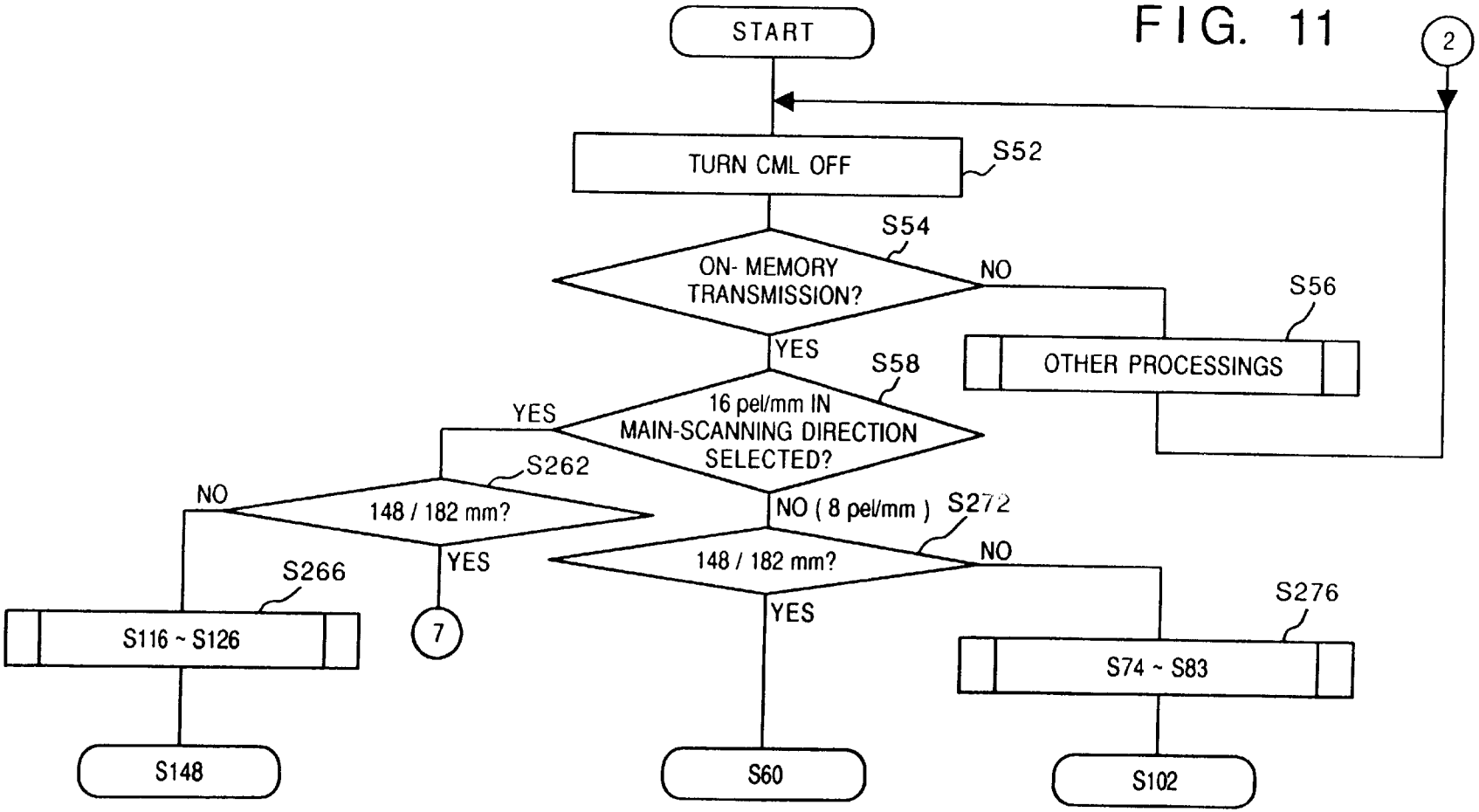
FIG. 11 is a flowchart showing control operation of the fourth embodiment.

Next, the operation of the fourth embodiment will be described with reference to FIG. 11 showing a part different from the operation in the first embodiment (FIGS. 2 to 5).

After the processings in steps S52 to S54, whether or not the pixel density in the main-scanning direction selected from the keyboard 44 is 16 pel/mm is determined in step S58. If YES, the process proceeds to step S262, in which whether or not the length of the original image in the main-scanning direction detected by the reader 10 is 148/182 mm is determined. If YES, the process proceeds to step S114, in which, upon reading, if the line density in the subscanning direction is lower than the pixel density in the main-scanning direction, the line density in the subscanning direction is raised close to the pixel density in the main-scanning direction. The read image data is stored into the memory 14, and upon transmission, a 90° rotation is performed in accordance with necessity.

On the other hand, if NO in step S262, i.e., the length of the original image in the main-scanning direction is neither 148 mm nor 182 mm, the process proceeds to step S266, in which the above-described processings in steps S116 to S126 are performed, i.e., reading image in a specified mode, storing the read image data into the memory 14, dialing to a destination apparatus, and pre-procedure for image transmission are performed. In step S148, the image transmission is performed without 90° rotation.

If NO in step S58, i.e., the selected pixel density in the main-scanning direction is 8 pel/mm, the process proceeds to step S272, in which whether or not the length of the original image in the main-scanning direction is 148/182 mm is determined. If YES, the process proceeds to step S60, in which, upon reading, if the line density in the subscanning direction is lower than the pixel density in the main-scanning direction, the line density in the subscanning direction is raised close to the pixel density in the main-scanning direction. Then, the read image data is stored into the memory 14, and upon transmission, a 90° rotation is performed in accordance with necessity.

If NO in step S272, i.e., the length of the original image in the main-scanning direction is neither 148 mm nor 182 mm, the process proceeds to step S276, in which the above-described processings in steps S74 to S83 are performed, i.e., reading in the specified mode, storing the read image data into the memory 14, dialing to the destination apparatus, and pre-procedure for the transmission are performed. Thereafter, the process proceeds to step S102 and the subsequent steps, to transmit the image data without 90° rotation.

In the first to fourth embodiments, the size of an original image is the same, however, in consideration of a case where the original includes pages of different sizes, execution of 90° rotation and resolution conversion may be determined upon storing image data into the memory.

In step S62, the reading may be performed at 8 line/mm in the subscanning direction, and in step S128, the reading may be performed at 16 line/mm in the subscanning direction.

In the above embodiment, the 90° rotator 20 rotates image data by 90°, however, the reader 10 may detect whether or not an original image has been read at a slant, i.e., neither of the shorter side nor longer side of the original image is parallel to the CCD scanning direction, and the rotator 20 may perform rotation in consideration of the detection result from the reader 10.

Further, in the above embodiment, whether or not a 90° rotation is made is determined in accordance with the size of an original image. However, the reader 10 may detect whether the original image has been read with the longer side at the top or it has been read with the shorter side at the top, and if the original has been read from the longer side, the image data may be 90° rotated.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of present invention can be made without departing from the spirit and scope thereof, it is to be understood that the invention is not limited to the specific embodiments thereof except as defined in the appended claims.

What is claimed is:

1. An image processing apparatus which scans an image in a first direction and inputs the scanned image, comprising:

specifying means for specifying a resolution of the image to be inputted with respect to a second direction perpendicular to the first direction;

input means for inputting the image at a predetermined resolution with respect to the second direction regardless of the resolution specified by said specifying means;

rotation means for rotating the image inputted by said input means by a predetermined angle; and conversion means for converting the resolution of the second direction in a resultant image obtained from rotating the image by said rotation means through the predetermined angle, in accordance with the resolution specified by said specifying means, wherein said input means inputs the image which has the length in the first direction corresponding to a short side of a predetermined-sized rectangular image, and the predetermined-sized rectangular image has half a length of a short side of a recording sheet in an image-output side.

2. The apparatus according to claim 1, wherein said input means inputs the image in one-line units with respect to a predetermined scanning direction.

3. The apparatus according to claim 2, wherein said specifying means specifies a line density between scanning lines of the image.

4. The apparatus according to claim 1, wherein the predetermined angle is 90°.

5. The apparatus according to claim 1, wherein said specifying means includes selection means for selecting one of a high resolution and a low resolution, and wherein the predetermined resolution for inputting the image by said input means is the high resolution selected by said selection means even though said selection means has selected the low resolution.

6. The apparatus according to claim 1, wherein said input means includes memory means for storing the input image, and wherein said rotation means rotates the image stored in said memory means.

7. The apparatus according to claim 6, wherein when the image is outputted to a predetermined terminal, said input means inputs the image at the predetermined resolution.

8. The apparatus according to claim 7, wherein said input means includes registration means for registering the predetermined terminal which receives the image at the predetermined resolution.

9. The apparatus according to claim 1, wherein said input means inputs an image of a predetermined size at the predetermined resolution.

10. The apparatus according to claim 1, further comprising transmission means for transmitting the image converted by said conversion means as a facsimile signal.

11. An image processing apparatus comprising:

specifying means for specifying a resolution with respect to a direction defined on an image;

input means for inputting the image at a predetermined resolution regardless of the resolution specified by said specifying means;

rotation means for rotating the image inputted by said input means by a predetermined angle from the direction; and conversion means for converting the resolution in a resultant direction obtained from rotating the image by said rotation means through the predetermined angle, in accordance with the resolution specified by said specifying means, wherein said input means inputs the image in one-line units with respect to a predetermined scanning direction, and wherein said input means inputs the image which has the length in the predetermined scanning direction corresponding to a short side of A5-sized paper.

12. An image processing method, in which an image is scanned in a first direction and the scanned image is inputted, comprising the steps of:

specifying a resolution of the image to be inputted with respect to a second direction perpendicular to the first direction;

inputting the image at a predetermined resolution with respect to the second direction regardless of the specified resolution;

rotating the inputted image by a predetermined angle; and converting the resolution of the second direction in a resultant image obtained from rotating the image by the predetermined angle, in accordance with the specified resolution, wherein said inputting step includes inputting the image which has the length in the first direction corresponding to a short side of a predetermined-sized rectangular image, and the predetermined-sized rectangular image has half a length of a short side of a recording sheet in an image-output side.

13. An image processing method comprising the steps of:

identifying image output capability at an image-output side;

inputting an image;

determining whether or not a rotation shall be performed on the image, in accordance with the identification result;

designating one of a high resolution and a low resolution with respect to a first direction; and rotating the inputted image by a predetermined angle in response to a positive determination in said determining step, wherein, in said inputting step, the resolution of the input image is varied in accordance with the determination result, and the image is input in said inputting step at the high resolution in a case where the low resolution is designated in said designating step and it is determined in said determining step that said rotating step shall execute the rotation, while the image is input at the low resolution in a case where it is determined in said determining step that said rotating step is not to be executed.

14. An image processing apparatus comprising:

identifying means for identifying image output capability at an image-output side;

input means for inputting an image;

rotation means for rotating the image inputted by said input means by a predetermined angle;

determination means for determining whether or not said rotation means shall execute rotation of the image, in accordance with the identification result; and designation means for designating one of a high resolution and a low resolution with respect to a first direction, wherein said input means varies a resolution of the inputted image in accordance with the determination result, and wherein said input means inputs the image at the high resolution in a case where said designation means designates the low resolution and said determination means determines that said rotation means shall execute the rotation, while said input means inputs the image at the low resolution in a case where said determination means determines that said rotation means shall not execute the rotation.

15. The apparatus according to claim 14, further comprising registering means for pre-registering image output capability for the image-output side, wherein said identifying means identifies the image output capability by reading out from said registering means, based on an instruction from the image-output side.

16. The apparatus according to claim 14, further comprising conversion means for converting the resolution of the image into a designated resolution designated by said designation means after said rotation means execute the rotation.

17. An image processing method comprising the steps of:

designating a resolution of an image;

setting a resolution at which the image is to be input;

inputting the image;

determining whether or not a rotation shall be performed on the image; and rotating the input image by a predetermined angle responsive to a positive determination in said determining step, wherein, in said setting step a predetermined resolution is set, taking the resolution of the image rotated in said rotating step into consideration, regardless of the designation in said designating step in a case where it is determined in said determining step that said rotating step shall be performed on the image.

18. An image processing apparatus comprising:

designation means for designating a resolution of an image;

input means for inputting the image;

rotation means for rotating the inputted image by a predetermined angle;

determination means for determining whether or not said rotation means shall execute rotation of the image; and control means for setting a resolution at which said input means inputs the image, wherein said control means sets a predetermined resolution, taking the resolution of the image rotated by said rotation means into consideration, regardless of the designation by said designation means in a case where said determination means determines that said rotation means shall execute the rotation.

19. The apparatus according to claim 18, wherein said designation means is capable of selecting at least one of either a high resolution or a low resolution.

20. The apparatus according to claim 19, wherein the predetermined resolution is the high resolution.

21. The apparatus according to claim 18, further comprising conversion means for converting the predetermined resolution of the image into a designated resolution designated by said designation means after said rotation means executes the rotation.

22. The apparatus according to claim 18, wherein said control means sets the resolution designated by said designation means in a case where said determination means determines that said rotation means shall not execute the rotation.

23. An image processing apparatus comprising:

designation means for designating one of a high resolution and a low resolution with respect to a predetermined direction;

input means for inputting an image; and rotation means for rotating the inputted image by a predetermined angle, wherein said input means inputs the image at the high resolution even though said designation means designates the low resolution, said rotation means executes the rotation in a case where said input means inputs a predetermined-sized image at a predetermined orientation, and wherein said rotation means executes the rotation in a case where the length in the predetermined direction of the predetermined-sized image is a short side of A5-sized paper.

24. The apparatus according to claim 23, further comprising conversion means for converting the resolution of the image into a designated resolution designated by said designation means after said rotation means executes the rotation.

25. The apparatus according to claim 24, wherein said input means includes scanning means for scanning the image in a direction perpendicular to the predetermined direction.

*26. An image communication apparatus comprising:*

*designation means for inputting a user designated format of image data to be transmitted to a destination;*

*input means for inputting image data in a predetermined format;*

*rotation means for rotating the image data inputted by said input means;*

*converting means for converting the image data rotated by said rotation means into image data having the format designated by said designation means; and*

*transmission means for transmitting the image data rotated by said rotation means and converted by said converting means to the destination.*

*27. The apparatus according to claim 26, further comprising reading means for reading an image original in the predetermined format, wherein*

*said input means inputs image data based on the image original read by said reading means.*

*28. The apparatus according to claim 27, wherein the format designated by said designation means is a format which an operator designates when reading the image original by said reading means.*

*29. The apparatus according to claim 26, wherein said designation means designates a resolution of the image data to be transmitted by said transmission means.*

*30. An image processing method operative in a data communication apparatus comprising:*

*a designation step of inputting a user designated format of image data to be transmitted to a destination;*

*an input step of inputting image data in a predetermined format;*

*a rotation step of rotating the image data inputted in said input step;*

*a converting step of converting the rotated image data into image data having the format designated in said designation step; and*

*a transmission step of transmitting the image data rotated in said rotation step and converted in said converting step to the destination.*

*31. The method according to claim 30, wherein said input step inputs image data based on an image original read by a reader provided in the data communication apparatus.*

*32. The method according to claim 31, wherein the format designated in said designation step is a format which an operator designates when reading the image original by the reader.*

*33. The method according to claim 30, wherein said designation step designates a resolution of the image data to be transmitted in said transmission step.*

*34. An image communication apparatus comprising:*

*designation means for inputting a user designated resolution of image data to be transmitted to a destination;*

*input means for inputting image data in a predetermined format;*

*processing means for rotating and converting the image data inputted by said input means so that a resolution of the image data rotated and converted by said processing means becomes the resolution designated by said designation means; and*

*transmission means for transmitting the image data rotated and converted by said processing means to the destination.*

*35. The apparatus according to claim 34, further comprising reading means for reading an image original in the predetermined format, wherein said input means inputs image data based on the image original read by said reading means.*

*36. The apparatus according to claim 35, wherein the resolution designated by said designation means is a resolution which an operator designates when reading the image original by said reading means.*

*37. The apparatus according to claim 34, wherein said processing means includes:*

*rotation means for rotating the image data inputted by said input means; and*

*converting means for converting the image data rotated by said rotation means into image data having the resolution designated by said designation means.*

*38. An image processing method operative in a data communication apparatus comprising:*

*a designation step of inputting a user designated resolution of image data to be transmitted to a destination;*

*an input step of inputting image data in a predetermined format;*

*a processing step of rotating and converting the image data inputted in said input step so that a resolution of the image data rotated and converted in said processing step becomes the resolution designated by said designation step; and*

*a transmission step of transmitting the image data rotated and converted in said processing step to the destination.*

*39. The method according to claim 38, wherein said input step inputs image data based on an image original read by a reader provided in the data communication apparatus.*

*40. The method according to claim 39, wherein the resolution designated in said designation step is a resolution which an operator designates when reading the image original by the reader.*

*41. The method according to claim 38, wherein said processing step includes:*

*a rotation step of rotating the image data inputted in said input step; and*

*a converting step of converting the rotated image data into image data having the resolution designated in said designation step.*

* * * * *

UNITED STATES PATENT AND TRADEMARK OFFICE

CERTIFICATE OF CORRECTION

PATENT NO. : Re. 38,177 E
DATED : July 8, 2003
INVENTOR(S) : Yoshida

It is certified that error appears in the above-identified patent and that said Letters Patent is hereby corrected as shown below:

Title page,
Item [57], ABSTRACT,
Line 8, “image” should read -- an image --.

Column 1,
Line 14, “Present” should read -- The present --.

Column 2,
Line 4, “first” should read -- the first --.

Column 5,
Line 8, “a” should read -- an --.

Column 6,
Line 18, “such the” should read -- so that --.

Column 8,
Lines 15 and 30, “proceeds” should read -- it proceeds --.

Column 9,
Line 26, “shows” should read -- shows a --;
Line 44, “proceeds” should read -- it proceeds --; and
Line 61, “perform” should read -- performing --.

Column 10,
Lines 36, 42 and 47, “proceeds” should read -- it proceeeds --;
Line 40, “with” should read -- with a --;
Line 52, “the” should read -- the process --; and
Line 67, “returns” should read -- it returns --.

UNITED STATES PATENT AND TRADEMARK OFFICE

CERTIFICATE OF CORRECTION

PATENT NO. : Re. 38,177 E
DATED : July 8, 2003
INVENTOR(S) : Yoshida

It is certified that error appears in the above-identified patent and that said Letters Patent is hereby corrected as shown below:

Column 11,
Line 12, “returns” should read -- it returns --;
Lines 17 and 48, “proceeds” should read -- it proceeds --;
Lines 30, 43 and 58, “returns” should read -- it returns --;
Line 31, “step” should read -- steps --; and
Line 42, “have” should read -- has --.

Column 12,
Line 2, “returns” should read -- it returns --.

Signed and Sealed this

Third Day of August, 2004

JON W. DUDAS
*Acting Director of the United States Patent and Trademark Office*